US011878656B2

(12) United States Patent
Mueller et al.

(10) Patent No.: US 11,878,656 B2
(45) Date of Patent: Jan. 23, 2024

(54) FIREARM ATTACHMENT ASSEMBLY (71) Applicant: Government of the United States, as represented by the Secretary of the Air Force, Wright-Patterson AFB, OH (US)

(72) Inventors: Michael Mueller, Yorktown, VA (US); Alexander Orsi, Dayton, OH (US); John Bales, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 253 days.

(21) Appl. No.: 17/327,735

(22) Filed: May 23, 2021

(65) Prior Publication Data
US 2022/0017017 A1 Jan. 20, 2022

Related U.S. Application Data (60) Provisional application No. 63/034,463, filed on Jun. 4, 2020.

(51) Int. Cl.
*B60R 7/14* (2006.01)
*F41A 23/18* (2006.01)
(52) U.S. Cl.
CPC ............... *B60R 7/14* (2013.01); *F41A 23/18* (2013.01)
(58) Field of Classification Search
CPC .................................. B60R 7/14; F41A 23/18
USPC ....................................................... 224/567
See application file for complete search history.

(56) References Cited

U.S. PATENT DOCUMENTS

| 2,783,896 | A | * | 3/1957 | Agostini | B60R 7/14 224/567 |
| 2,958,422 | A | * | 11/1960 | Caloiero | A47B 81/005 211/64 |
| 4,132,315 | A | * | 1/1979 | Young | E05B 73/00 211/64 |
| 6,129,252 | A | * | 10/2000 | Jackson | B60R 7/14 224/406 |
| 7,137,511 | B1 | * | 11/2006 | Crowell | F41A 23/18 248/176.1 |
| 7,467,719 | B2 | * | 12/2008 | Crowell | F41A 23/18 211/64 |
| 8,910,560 | B2 | * | 12/2014 | Irwin | B60R 7/14 42/70.11 |
| 9,884,593 | B2 | * | 2/2018 | Hull | B60R 7/14 |
| 10,144,358 | B2 | * | 12/2018 | Fife | A47F 5/08 |
| 10,576,900 | B2 | * | 3/2020 | Bornais | F41A 23/18 |
| 10,882,458 | B2 | * | 1/2021 | Laborde, Jr. | F41C 33/005 |
| 11,110,867 | B2 | * | 9/2021 | Franklin | A47F 7/0028 |
| 11,326,851 | B1 | * | 5/2022 | Oldham | A47B 81/005 |
| 11,484,139 | B1 | * | 11/2022 | Hagberg | F41A 23/18 |
| 2003/0150972 | A1 | * | 8/2003 | Murray | B60R 7/14 211/64 |

(Continued)

*Primary Examiner* — Peter N Helvey
(74) *Attorney, Agent, or Firm* — AFMCLO/JAZ; Jeffrey R. Moore (57) ABSTRACT

A firearm rack assembly for securing at least one firearm that is removably attachable to a vehicle. The rack including a rifle attachment assembly, a pistol attachment assembly, an assembly post assembly wherein the rifle attachment assembly and pistol attachment assembly are removably joined to the assembly post and the assembly post is removably attachable to the vehicle.

17 Claims, 9 Drawing Sheets

(56) References Cited

U.S. PATENT DOCUMENTS

| | | | |
|---|---|---|---|
| 2011/0168649 A1* | 7/2011 | Stolz | A47B 81/005 |
| | | | 211/64 |
| 2014/0312087 A1* | 10/2014 | Malingen | B60R 7/14 |
| | | | 224/539 |
| 2015/0069103 A1* | 3/2015 | Fife | B60R 7/14 |
| | | | 224/555 |
| 2016/0238337 A1* | 8/2016 | Hull | A47B 96/1475 |

\* cited by examiner

FIREARM ATTACHMENT ASSEMBLY

Pursuant to 37 C.F.R. § 1.78(a)(4), this application claims the benefit of and priority to prior filed Provisional Application Ser. No. 63/034,463, filed Jun. 4, 2020, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to racks for storing and securing firearms in vehicles, particularly aircraft where conflicting priorities of weight, security and access must be balanced where in the firearm rack provides improved features for securing the firearms stored therein against theft and unauthorized use.

BACKGROUND OF THE INVENTION

A problem associated with prior art firearm racks is the difficulty in securing the firearms against damage, theft or other unauthorized access. Aircraft attachment and mobility are further improved by a lighter weight design. Military and police benefit from ease of visibility of the secured firearms for count and accountability purposes. Previous designs may be circumvented by cutting or force/leverage applied to the lock. Further, attachment to the main structure, whether aircraft or automobile and the like, is either not removable, or inconvenient to remove and/or move. Finally, a firearm rack that may be transported with the firearms secured and independently attached and detached from the aircraft or automobile and the like would have advantages over the prior art.

Therefore a modular storage system made to hold and secure a variety of small arms including rifles, pistols and shotguns. In one embodiment the system may be designed to primarily interface and attach to C-130 aircraft cargo bay seat rails for aircraft transport.

SUMMARY OF THE INVENTION

The present invention overcomes the foregoing problems and other shortcomings, drawbacks, and challenges of prior firearm securing assemblies for vehicles. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention of a firearm rack assembly for securing at least one firearm being removably attachable to a vehicle. The firearms rack including a rifle attachment assembly, a pistol attachment assembly, an assembly post assembly wherein the rifle attachment assembly and pistol attachment assembly are removably joined to the assembly post and the assembly post is removably attachable to the vehicle.

In one embodiment the firearm rack assembly may include wherein the assembly post is removably attached to the vehicle by an adjustable assembly post end and, having at least one adjustable assembly post aperture, an assembly post channel and a fixed assembly post end channel. The assembly post further including an integrated center pistol lock shield.

In one embodiment of the firearm rack assembly where the adjustable assembly post end is secured by aligning an assembly post aperture with an adjustable assembly post aperture and securing with a pin through the assembly post aperture and the adjustable assembly post aperture such that the adjustable channel and the assembly post channel are secured to the vehicle.

The firearm rack assembly pin may include a lock thereby substantially inhibiting unauthorized removal of the firearm rack from the vehicle.

The firearm rack assembly rifle attachment assembly may further include a plurality of rifle plates having a top rifle plate pin aperture, a center rifle plate pin aperture, and a a bottom rifle plate pin aperture. The plurality of rifle plates designed to assemble together and attach to the assembly post having an inner right rifle plate and an inner left rifle plate using a top rifle plate pin, a center rifle plate pin and a bottom rifle plate pin.

The firearm rack assembly may include the rifle attachment assembly attached to the assembly post by at least one threaded rifle knob and removably attachable to the center rifle plate pin having at least one threaded portion.

The center rifle plate pin may include a lock aperture and at least one threaded rifle knob removably attachable to the center rifle plate pin also having at least one threaded portion. The assembly center rifle plate pin may further include at least one center rifle plate pin aperture(s). The rifle attachment assembly may be secured with a lock through the at least one center rifle plate pin aperture.

The pistol attachment assembly may include include a plurality of pistol plates removably attachable to a pistol base using a pistol rack pin having a left half pistol pin and; a right half pistol pin which joins together with the plurality of pistol plates, the pistol base and the assembly post at the center pistol lock shield. The plurality of pistol plates may include protuberances enabling an interlocking assembly with the pistol base. A plurality of locks are installed on the pistol pin and the center rifle plate pin thereby substantially inhibiting unauthorized access to the at least one firearm. A plurality of locks may be installed on the pistol pin and the center rifle plate pin thereby substantially inhibiting unauthorized access to the at least one firearm.

In one embodiment the firearm rack assembly for securing at least one firearm, removably attachable to a vehicle, may comprise in combination a rifle attachment assembly having a plurality of rifle plates. The rifle plates may have a top rifle plate pin aperture, a center rifle plate pin aperture, and a bottom rifle plate pin aperture, the plurality of rifle plates designed to assemble together and attach to the assembly post having an inner right rifle plate and an inner left rifle plate using a top rifle plate pin, a center rifle plate pin) and a bottom rifle plate pin The pistol attachment assembly may include a plurality of pistol plates removably attachable to a pistol base using a pistol rack pin. The may include a left half pistol pin and a right half pistol pin; which joins together with the plurality of pistol plates, the pistol base and the assembly post at the center pistol lock shield. The plurality of pistol plates may include protuberances enabling an interlocking assembly with the pistol base.

In one embodiment the assembly post is removably attached to the vehicle by an adjustable assembly post end, having an assembly post channel and a fixed assembly post end channel. The assembly post may further include an integrated center pistol lock shield assembled to secure at least one firearm. The pin may alternatively include a lock thereby substantially inhibiting unauthorized removal of the firearm rack from the vehicle.

The rifle attachment assembly may include at least one threaded rifle knob removably attachable to the center rifle plate pin having at least one threaded portion. The rifle attachment assembly center rifle plate pin includes a lock aperture and at least one threaded rifle knob removably attachable to the center rifle plate pin having at least one threaded portion. The assembly center rifle plate pin may include at least one center rifle plate pin aperture. The rifle attachment assembly is secured with a lock through the at least one center rifle plate pin aperture.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration. Used herein, left and right are with respect to the referenced figures and are equivalent to first and second for claim purposes.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 1:
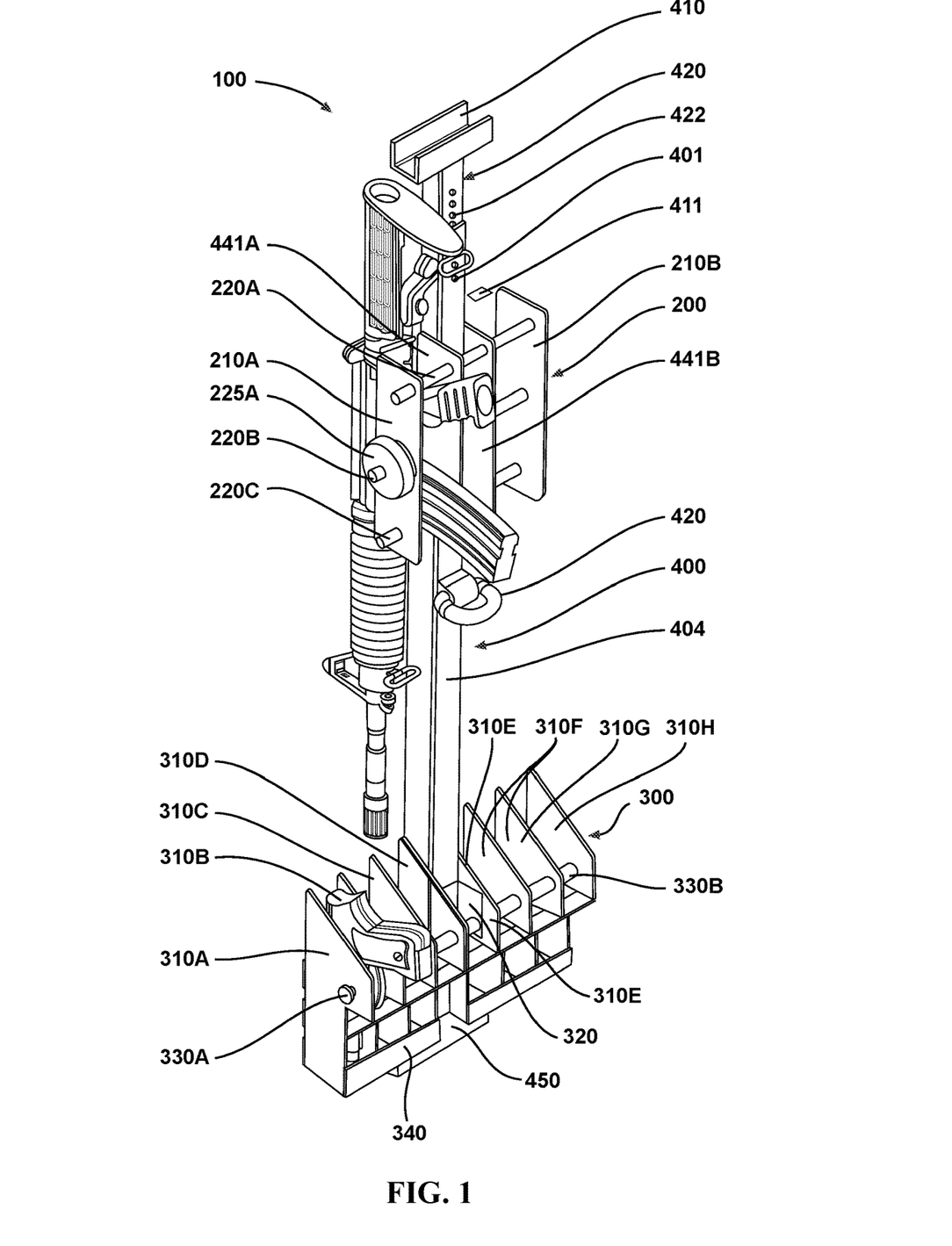
FIG. 1 is a perspective view of one embodiment of a firearm rack assembly according to the present invention.

FIG. 1 is an illustration of the present invention integrated as a firearm rack assembly 100 which as shown includes a rifle attachment assembly 200 and a pistol attachment assembly 300 jointed to an assembly post 400 designed to attach to a vehicle of choice (not shown) such as an aircraft, train or automobile. In one application, the firearms rack 100 is designed to attach to a C-130 aircraft at the aircraft seat rails. Details of each major assembly follow FIG. 1 where like elements have like numerical identifiers for the convenience of the reader.

As illustrated in FIG. 1 the assembly post 400 may include an assembly post aperture 401, and be adjustably attached to an adjustable telescope end 420 via a pin 411. The assembly post aperture 401, as with all the apertures here in, are defined as a circumferential area void of material, or defined void of material, to facilitate through placement of a pin lock or adjacent component material (e.g. commonly know as a hole or slot) to facilitate assembly and ease of disassembly. The adjustable telescope end 420 preferably includes at least one adjustable telescope end aperture 422, or more preferably a plurality of adjustable telescope end apertures 422 to facilitate rapid securing of the firearm assembly 100 to a vehicle (not shown). The adjustable telescope end 420 is extendable and contractible with respect to a main post 404. The main post 404 may include a security attachment ring (ring) 460 for securing the entire firearm rack assembly 100 to a vehicle or other location with for example a lock and chain (not shown).

As illustrated in FIG. 1. The adjustable telescope end 420 may further include an adjustable Channel 410 to facilitate securing the firearm rack assembly 100 to a vehicle. In one embodiment the pin 411 may be lockable. Alternatively it may be welded in place or otherwise secured permanently. The plurality of adjustable telescope end post apertures 422 may be designed to work with the pin 411 and the assembly post aperture 401 to secure the firearm rack assembly 100 at variable lengths for securing to various vehicles and or various locations in a particular vehicle. As illustrated in FIG. 1 the firearm rack assembly post 400 may include (at an opposite end) a fixed assembly post end 450, preferably with a fixed assembly post channel end 451 (See FIG. 3). As further shown in FIG. 1 the assembly post 400 may include an inner right rifle plate 441B and an inner left rifle plate 441A. The inner left and right rifle plates may be permanently attached to the assembly post in any manner known in the art, including welding, or removable attached by any means known in the art such as bolts, nuts, or pins. In either configuration, the inner left and right rifle plates are, juxtaposed the rifle attachment assembly 200.

As illustrated in FIG. 1 the rifle attachment assembly 200 may include an assembly of removable components configured to secure a long gun such as a shotgun and/or rifle, and the like. The rifle attachment assembly 200 may include a right rifle plate 210B, a left rifle plate 210A, a top rifle plate pin 220A, and a bottom rifle plate pin 220C. The parts fitted and held together and in place by at least a central rifle plate pin 220B secured with at least the illustrated left threaded rifle plate knob 225A where all three pins extend through aligned apertures in the an inner left rifle plate 441A and an inner right rifle plate 441B (See FIG. 2 and FIG. 5).

Figure 2:
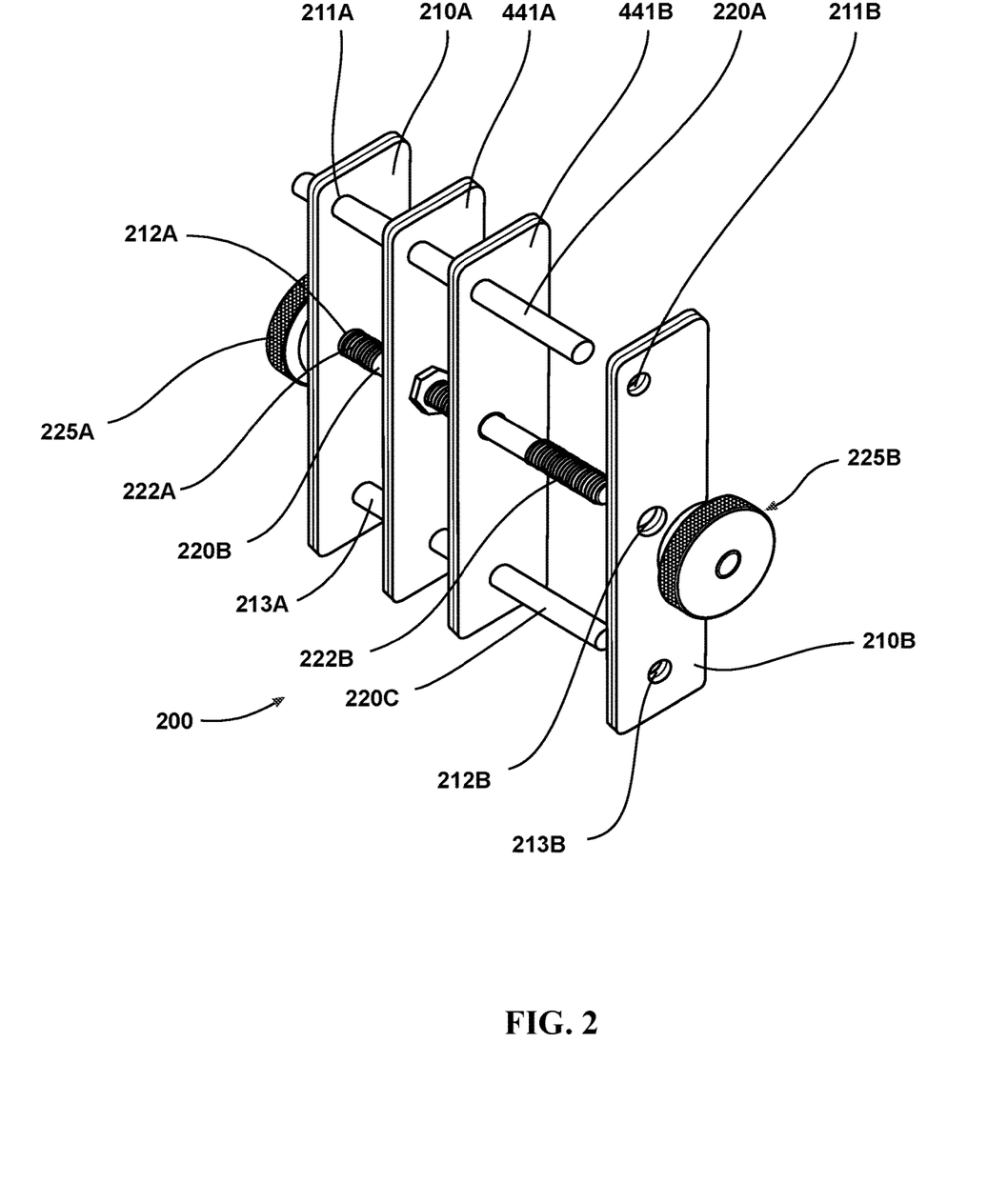
FIG. 2 is an illustration of on embodiment of the rifle attachment assembly portion of the present invention.

As illustrated in FIG. 1, and in FIG. 2 with greater detail, the left rifle plate 210A includes a top rifle plate aperture 211A through which when assembled, protrudes an top rifle plate pin 220A, a center rifle plate aperture 212A, through which protrudes a center rifle plate pin 220B and a bottom rifle plate aperture 213A, through which protrudes a bottom rifle plate pin 220C. Preferably, at least one of the three pins are threaded. The center rifle plate pin 220B preferably includes at least one threaded portion. As illustrated in FIG. 2 the center rifle plate pin threaded portions may include a left threaded portion 222A designed to connect with a left threaded rifle knob 225A which can secure the assembly together. In one embodiment, only one knob may be needed as shown in FIG. 1 if the rifle plate pins have a head larger than their corresponding aperture. The center rifle plate pin 220 may extend when assembled through a second assembly post aperture 402 (Shown in FIG. 3). As further shown in FIG. 1 the assembly post 400 may include an inner right rifle plate 441A and an inner left rifle plate 441B.

As alternatively illustrated in FIG. 2, a right threaded rifle knob 225B may be used to assemble the rifle attachment assembly 200 by threading the right threaded rifle knob 225B to the center rifle plate pin 220B at a right threaded portion 222B (on the opposite end of the center rifle plate pin 220B from the left threaded portion 222A).

FIG. 2 illustrates an embodiment with removable/attachable inner left rifle plate 441A and inner right rifle plate 441B. The assembly further illustrating the relationships between the left rifle plate 210A, the right rifle plate 210B. As illustrated the left rifle plate 210A includes the top rifle plate aperture 211A through which when assembled, protrudes the top rifle plate pin 220A, a center rifle plate aperture 212A, through which protrudes a center rifle plate pin 220B and a bottom rifle plate aperture 213A, through which protrudes a bottom rifle plate pin 220C.

As illustrated in FIG. 2 the right rifle plate 210B includes the top rifle plate aperture 211B through which when assembled, protrudes the top rifle plate pin 220A (not shown protruded for illustration), a center rifle plate aperture 212B, through which protrudes a center rifle plate pin 220B (not shown protruded for illustration) and a bottom rifle plate aperture 213B, through which protrudes a bottom rifle plate pin 220C (not shown protruded for illustration). Preferably, at least one of the three pins have at least one pin threaded portion 222A and/or 222B shown on the center rifle plate pin 220B. The assembly is secured by a left threaded rifle knob 225A and a right threaded rifle knob 225B attached at each end of the center rifle plate pin 220B.

Continuing with FIG. 1, the firearm rack assembly 100 may further include the pistol attachment assembly 300 designed to hold handguns separately from the rifles or shotguns. The pistol attachment assembly 300 may include a plurality of pistol plates 310A, 310B, 310C, 310D, 310E 310F, 310G and 310H as shown in FIG. 1. Each pistol plate 310 et al. having a corresponding pistol plate aperture as specifically illustrated in FIG. 4A, FIG. 4B and FIG. 4C, discussed further below. The plurality of pistol plates 310A-310G are preferably secured to a pistol base 340 with a pistol pin having a left half pistol pin 330A and a right half pistol pin 330B which secures the plurality of pistol plates 310A-310H to the assembly post at a center pistol lock shield 320 with any commercial lock (not shown) that will secure the left half pistol pin 330A to the right half of the pistol pin 330B. The pistol pins being specifically illustrated in FIG. 8A, and FIG. 8B discussed further below.

Figure 3:
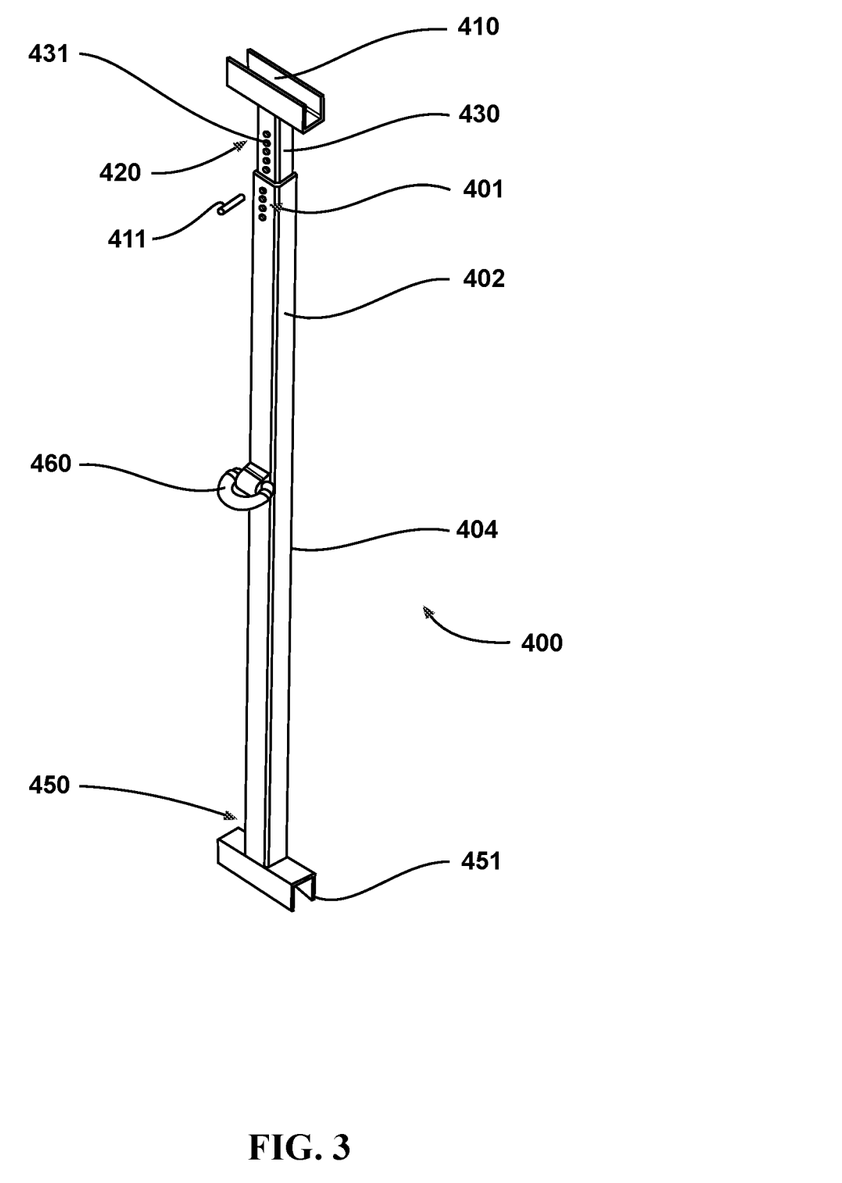
FIG. 3 is an illustration of one embodiment of the assembly post portion of the present invention.

FIG. 3 is an illustration of one embodiment of the assembly post 400 where the firearm rack assembly post 400 has a main post 404. The main post 404 includes a fixed assembly post end 450 having a a fixed assembly post channel end 451. The main post 400 may further include a security attachment ring (ring) 460 wish facilitates chaining the firearms wrack assembly to any other structure, increasing the difficultly of unauthorized movement of the firearms assembly. The main post 404 includes at least one main post aperture (s) 401. At the opposite end of the main post 404 is an adjustable telescope end 420.

As illustrated in FIG. 3 between the two ends the main post may include a second aperture 402, through which the rifle attachment assembly (not shown) may be secured.

FIG. 3 further illustrates the adjustable telescopic end 420 including a telescopic tube 430 having a telescopic channel 410 (adjustable channel) for securing the firearms rack assembly to the inside of a vehicle such as in one embodiment an aircraft, particularly a transport aircraft and more particularly a C-130. The telescopic tube 430 may further have a plurality of telescopic tube apertures 431 configured to use a pin or lock (not shown) through one of them and a selected main post aperture to establish a fixed length for the combined main post 404 and telescopic tube 430. The adjustable telescope end 420 preferably includes at least one adjustable telescope end aperture 422, or more preferably a plurality of adjustable telescope end apertures 422 to facilitate rapid securing of the firearm assembly 100 to a vehicle (not shown). As illustrated in FIG. 3 the adjustable telescope end 420 may further include an adjustable Channel 410 secured to the telescopic tube 430 to facilitate securing the firearm rack assembly 100 to a vehicle. In one embodiment a pin 411 that extends through a desired combination of main post aperture 401 and an adjustable telescope tube apertures 431 for the desired overall assembly post 400 length for attachment and or security. Pin 411 may in one embodiment be lockable by any means known in the art Alternatively the main post 404 and the adjustable telescopic end 420 may be welded in place or otherwise secured permanently. The plurality of adjustable telescope tube apertures 431 may be designed to work with the pin 411 and the main post aperture 401 to secure the firearm rack assembly 100 at variable lengths for securing to various vehicles and or various locations in a particular vehicle.

As illustrated in FIG. 3 the assembly post 400 may include at an opposite end a fixed assembly post end 450, preferably with a fixed assembly post channel end 451.

Figure 4A:
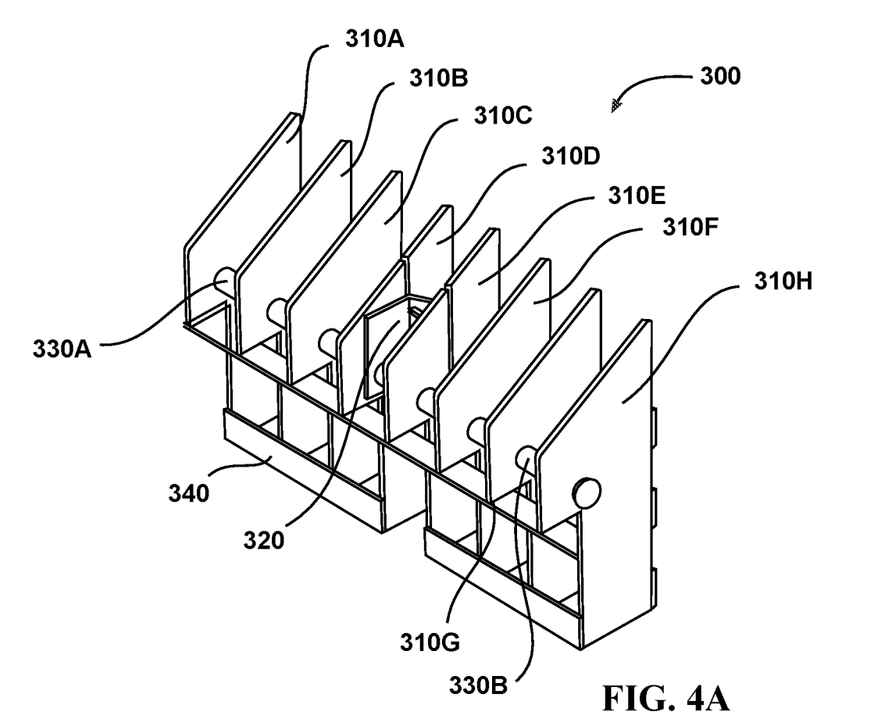
FIG. 4A is an illustration of one embodiment of the pistol rack assembly portion of the present invention.

FIG. 4A is an isolated illustration of the pistol attachment assembly 300 with the pistol plates 310A, 310B, 310C, 310D, 310E 310F 310G, 310H held together by the pistol pin 330 and attached to the pistol base 340. The pistol pin having a left half pistol pin 330A and a right half pistol pin 330B joined together within the center pistol lock shield 320.

Figure 4B:
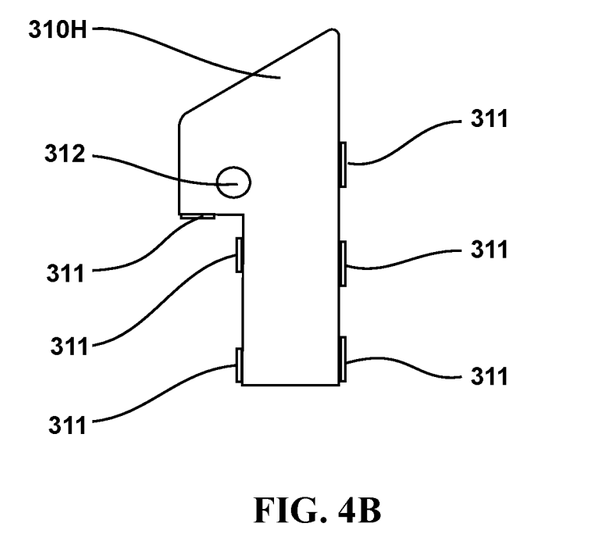
FIG. 4B is an illustration of one embodiment of the pistol plates of the present invention.

FIG. 4B is an isolated illustration of a pistol plate 310H, illustrating the pistol plate aperture 312 and a plurality of pistol plate protuberances 311 which allow the pistol plate 310H to properly align and be secured in the pistol base (not shown). The plurality of pistol plate protuberances 311 may be any shape or location on the exempluary pistol plate 310H.

Figure 4C:
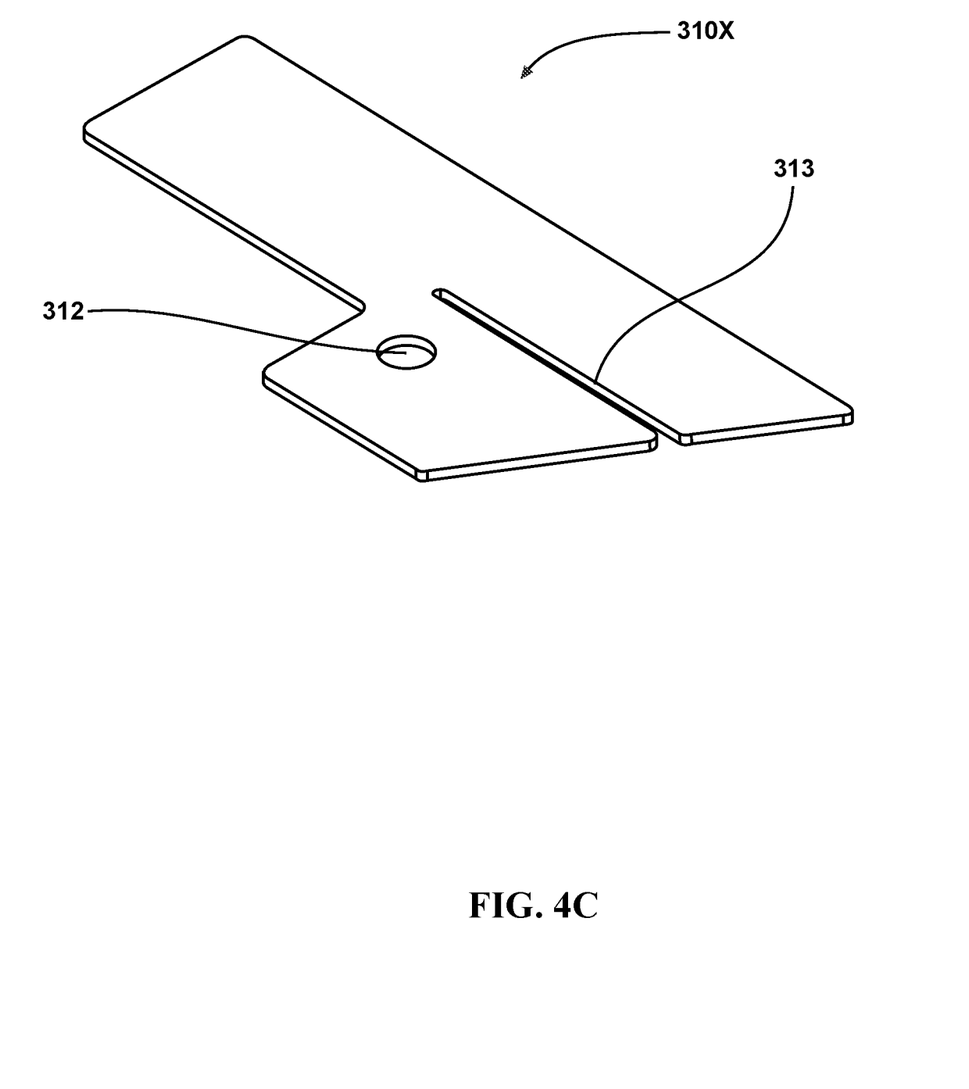
FIG. 4C is an alternate illustration of one embodiment of the pistol plates of the present invention.

FIG. 4C is an alternate illustration of a pistol plate 310X with pistol plate aperture 312, where a pistol plate slot 313 is used instead of protuberances to secure the pistol plate 310X in place on the pistol base (not shown).

Figure 5:
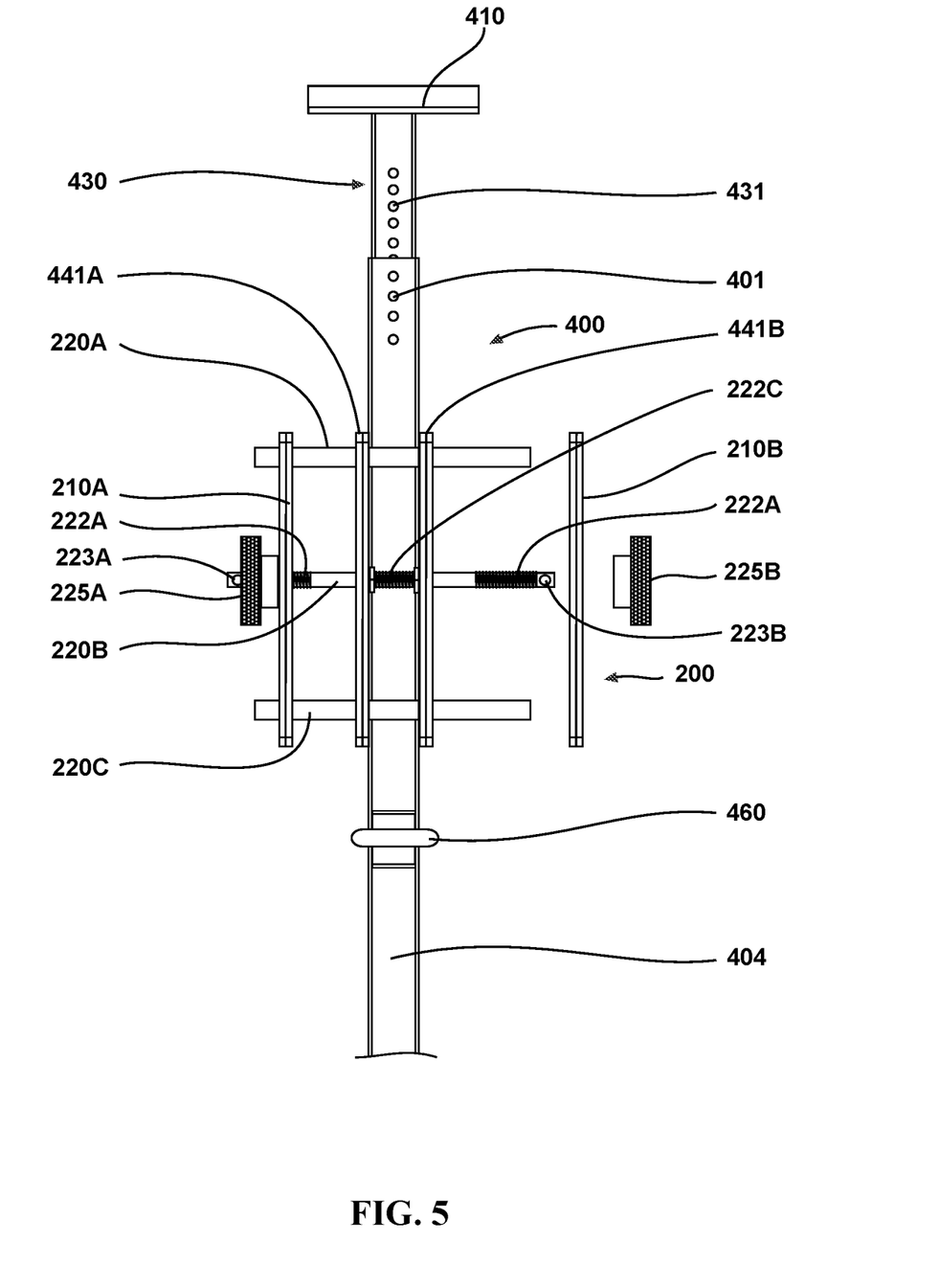
FIG. 5 is an illustration of one embodiment of the rifle rack assembly and assembly post portion of the present invention.

FIG. 5 is an alternate view of a portion of the assembly post 400 with the the rifle attachment assembly 200, having a left rifle plate 210A, a right rifle plate 210B, and a center rifle plate pin 220B. The center rifle plate pin 220B further including at least on threaded portion 222A, 222B and/or 222C shown. The center rifle plate pin 220B further having at least one lock aperture 223A, and/or 223B shown.

FIG. 5 is an alternate illustration wherein the rifle attachment assembly 200 is again shown with the the left rifle plate 210A, right rifle plate 210B, the top rifle plate pin 220A, and a bottom rifle plate pin 220C. The parts fitted and held together and in place by at least the central rifle plate pin 220B secured with at least the illustrated left threaded rifle plate knob 225A and a second (right) threaded rifle plate knob 225B. The portion of the assembly post 400 shown includes a portion of the main post 404, the adjustable telescope end 420, the assembly main post apertures 401, telescopic tube 430 and tube apertures 431 and the adjustable telescopic channel 410. Ring 460 and main post apertures 401 are also illustrated.

Figure 6A:
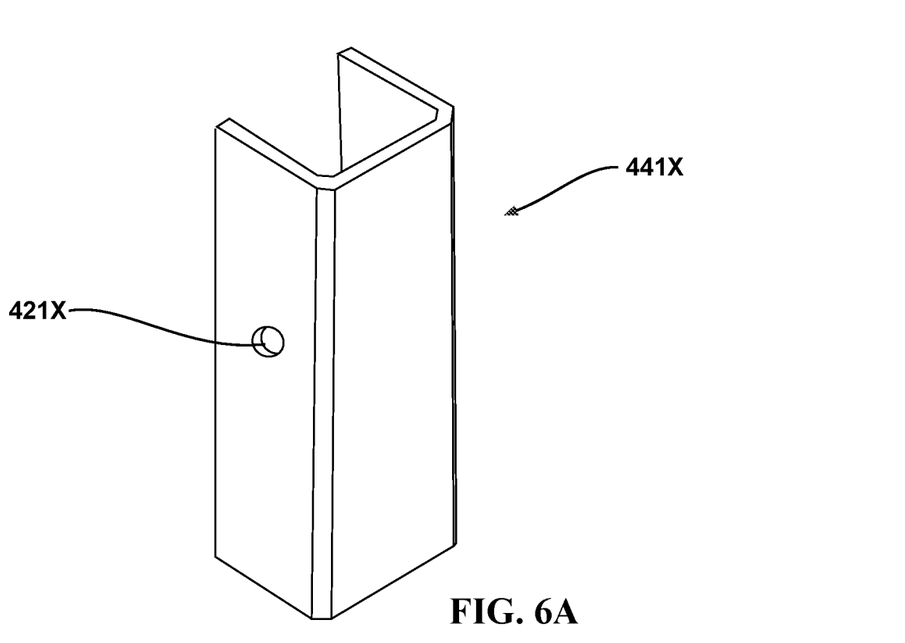
FIG. 6A is an illustration of one embodiment of the inner rifle plate.
Figure 6B:
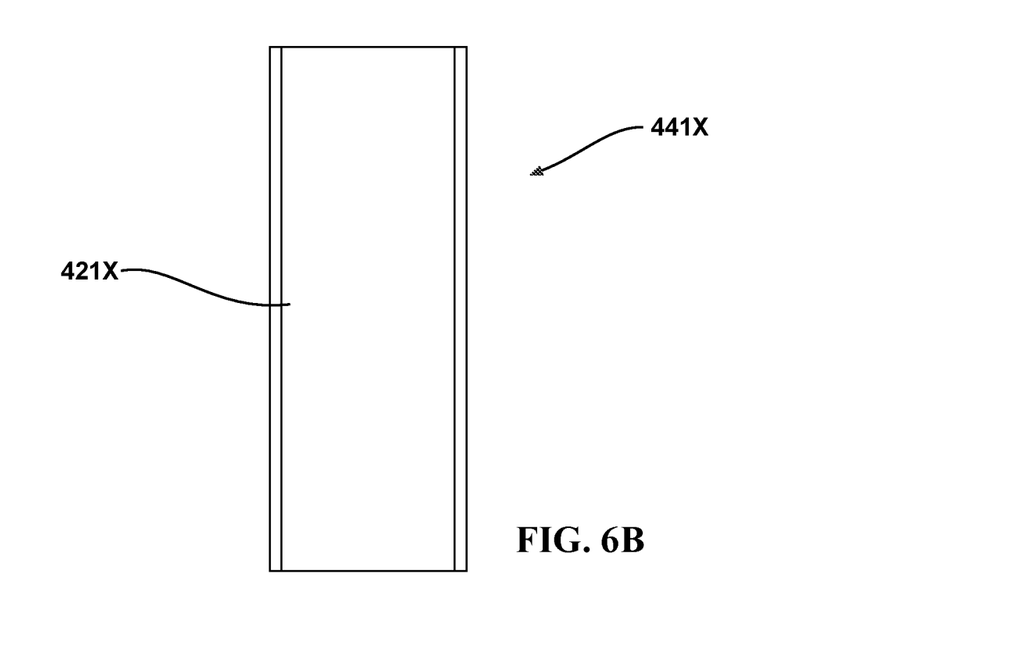
FIG. 6B is an illustration of an alternate embodiment of the inner rifle plate.
Figure 7:
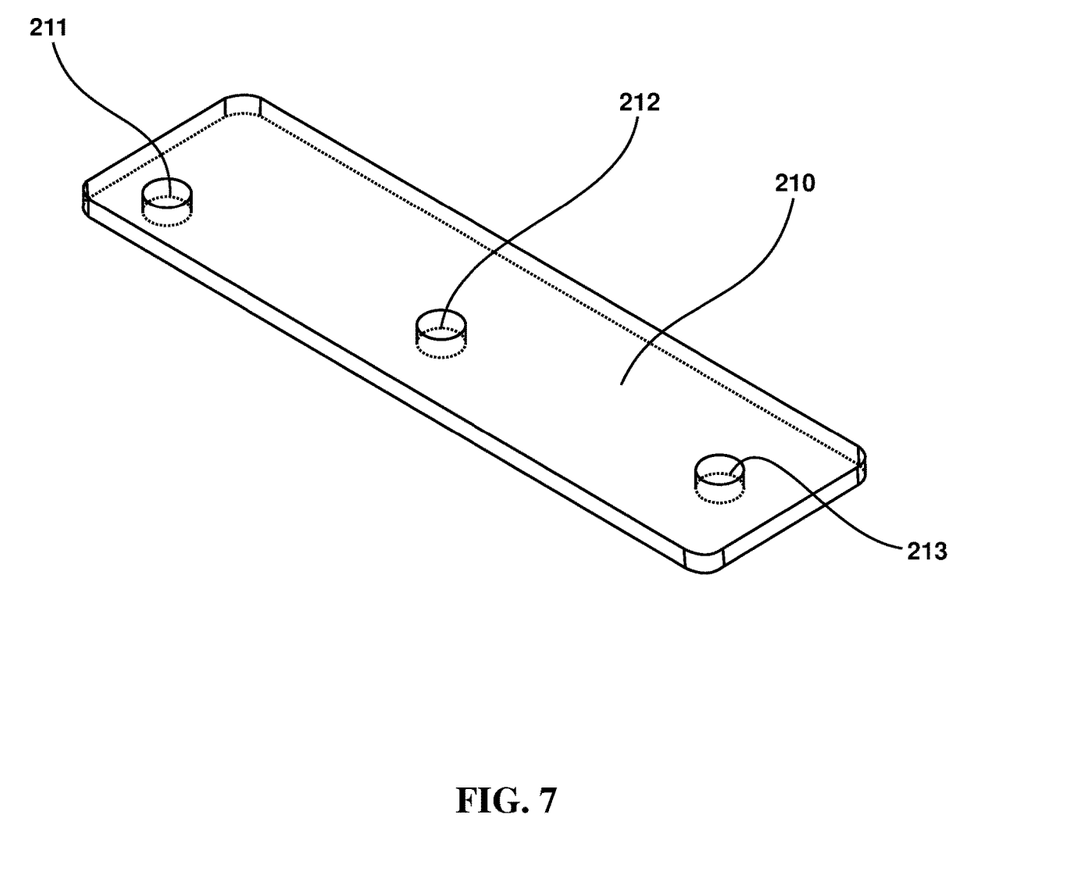
FIG. 7 is an illustration of one embodiment of the left and or right rifle plate.

In an alternate embodiment illustrated in FIG. 6A and FIG. 6B, the inner right rifle plate 441A and inner left rifle plate 441B of FIG. 5 are combined to form a U joint 441X with at least one aperture 421X that may secure the rifle attachment assembly (not shown) to the main post (not shown) for added security. In an alternate embodiment illustrated in FIG. 7, a rifle plate 210 is shown with a top rifle plate aperture 211, a center rifle plate aperture 212 and a bottom rifle plate aperture 213. In on embodiment U joint 441x may include apertures that align with all three rifle plate apertures for attachment to the assembly post.

Figure 8A:
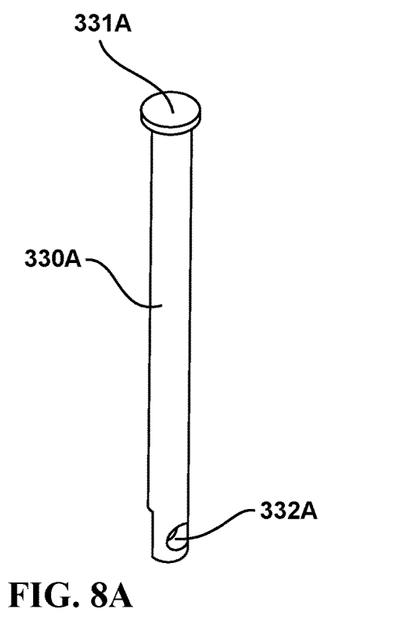
FIG. 8A is an illustration of one half of a pistol pin.
Figure 8B:
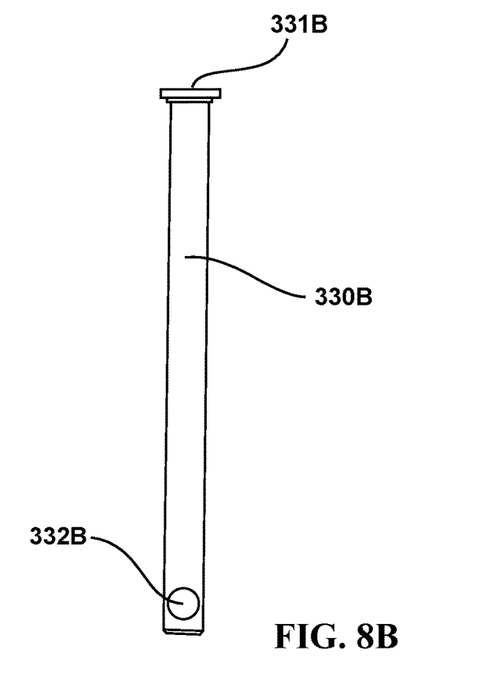
FIG. 8B is an illustration of an opposite half of a pistol pin.

FIG. 8A and FIG. 8B are an illustration of a pistol pin 330 a left half pin 330A and a right half pin. The left half pin 330A having a left pistol pin head 331A and a left pistol pin aperture 332A. The right half pin 330B having a right pistol pin head 331B and a right pistol pin aperture 332B. The two half pins 330A and 330B may be joined at their apertures 332A and 332B by any means know in the art, preferably a lock to secure the pistols to the firearm rack assembly 100. In one embodiment the pistol pin heads 331A and 331B are larger than the corresponding pistol plate apertures through which the pistol pins are inserted to secure a plurality of pistols within the pistol attachment assembly.

Figure 9:
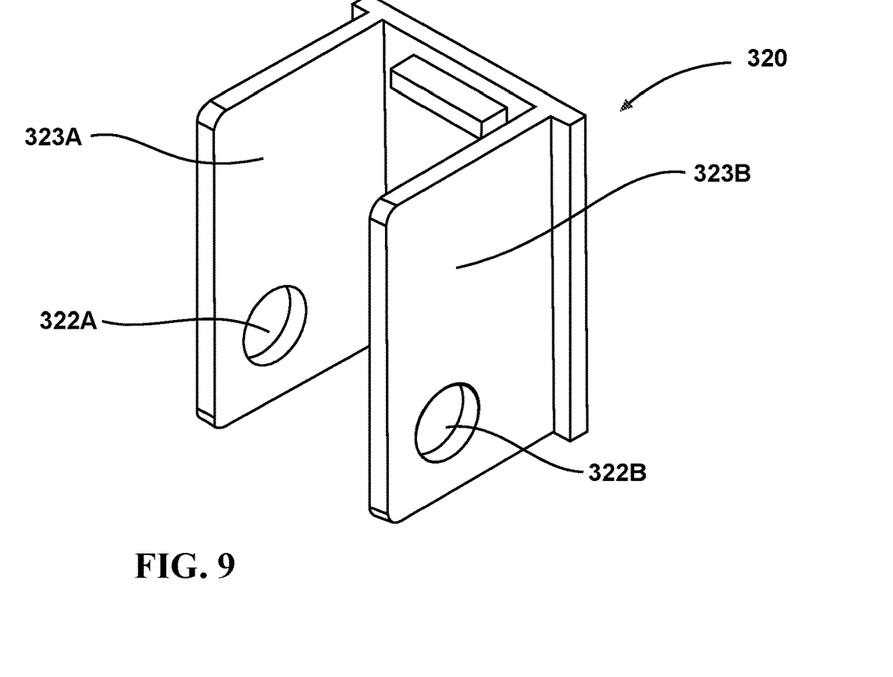
FIG. 9 is an illustration of one embodiment of an alternate embodiment of a pistol lock shield.

FIG. 9 illustrates an embodiment of the pistol lock shield 320 between which the half pistol pin apertures are joined by protruding through each lock shield aperture 322A and lock shield aperture 322B by any means known in the art, such as a lock. The pistol lock shield sides 323A and 323B provide added protection to the lock used and may add rigidity to the entire structure with minimum weight. An important consideration with some vehicles such as aircraft.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A firearm rack assembly for securing at least one firearm, removably attachable to a vehicle, comprising, in combination:
    a rifle attachment assembly;
    a pistol attachment assembly;
    a assembly post assembly wherein the rifle attachment assembly and pistol attachment assembly are removably joined to the assembly post and the assembly post is removably attachable to the vehicle; the assembly post is removably attached to the vehicle by an adjustable assembly post end, having at least one adjustable assembly post aperture; an assembly post channel and a fixed assembly post end channel; the assembly post further including an integrated center pistol lock shield;
    the adjustable assembly post end is secured by aligning an assembly post aperture with an adjustable assembly post aperture and securing with a pin through the assembly post aperture and the adjustable assembly post aperture such that the adjustable channel and the assembly post channel are secured to the vehicle and wherein;
    the pin includes a lock thereby substantially inhibiting unauthorized removal of the firearm rack from the vehicle.

2. The firearm rack assembly of claim 1 wherein the rifle attachment assembly includes:
    a plurality of rifle plates having;
        a top rifle plate pin aperture;
        a center rifle plate pin aperture;
        a bottom rifle plate pin aperture;
        the plurality of rifle plates designed to assemble together and attach to the assembly post having an inner right rifle plate and an inner left rifle plate using a top rifle plate pin, a center rifle plate pin and a bottom rifle plate pin.

3. The firearm rack assembly of claim 2 wherein the rifle attachment assembly is attached to the assembly post by at least one threaded rifle knob removably attachable to the center rifle plate pin having at least one threaded portion.

4. The firearm rack assembly of claim 3 wherein the rifle attachment assembly center rifle plate pin includes a lock aperture by at least one threaded rifle knob removably attachable to the center rifle plate pin having at least one threaded portion.

5. The firearm rack assembly of claim 4 wherein the assembly center rifle plate pin includes at least one center rifle plate pin aperture.

6. The firearm rack assembly of claim 5 wherein the rifle attachment assembly is secured with a lock through the at least one center rifle plate pin aperture.

7. The firearm rack assembly of claim 2 wherein the pistol attachment assembly includes:
    a plurality of pistol plates removably attachable to;
    a pistol base using;
    a pistol rack pin having a left half pistol pin and;
    a right half pistol pin; which joins together with the plurality of pistol plates, the pistol base and the assembly post at the center pistol lock shield.

8. The firearm rack assembly of claim 7 wherein the plurality of pistol plates include protuberances enabling an interlocking assembly with the pistol base.

9. The firearm rack assembly of claim 8 wherein a plurality of locks are installed on the pistol pin and the center rifle plate pin thereby substantially inhibiting unauthorized access to the at least one firearm.

10. The firearm rack assembly of claim 7 wherein a plurality of locks are installed on the pistol pin and the center rifle plate pin thereby substantially inhibiting unauthorized access to the at least one firearm.

11. A firearm rack assembly for securing at least one firearm, removably attachable to a vehicle, comprising, in combination:
- a rifle attachment assembly having a plurality of rifle plates having; a top rifle plate pin aperture, a center rifle plate pin aperture, a bottom rifle plate pin aperture, the plurality of rifle plates designed to assemble together and attach to the assembly post having an inner right rifle plate and an inner left rifle plate using a top rifle plate pin, a center rifle plate pin and a bottom rifle plate pin;
- a pistol attachment assembly, the pistol attachment assembly including a plurality of pistol plates removably attachable to a pistol base using a pistol rack pin; the pin having a left half pistol pin and a right half pistol pin; which joins together with the plurality of pistol plates, the pistol base and the assembly post at the center pistol lock shield;
- a assembly post the assembly post is removably attached to the vehicle by an adjustable assembly post end, having a assembly post channel and a fixed assembly post end channel; the assembly post further including an integrated center pistol lock shield; assembled to secure at least one firearm.

12. The firearm rack assembly of claim 11 wherein the pin includes a lock thereby substantially inhibiting unauthorized removal of the firearm rack from the vehicle.

13. The firearm rack assembly of claim 12 wherein the rifle attachment assembly by at least one threaded rifle knob removably attachable to the center rifle plate pin having at least one threaded portion.

14. The firearm rack assembly of claim 13 wherein the rifle attachment assembly center rifle plate pin includes a lock aperture and at least one threaded rifle knob removably attachable to the center rifle plate pin having at least one threaded portion.

15. The firearm rack assembly of claim 14 wherein the assembly center rifle plate pin includes at least one center rifle plate pin aperture.

16. The firearm rack assembly of claim 15 wherein the rifle attachment assembly is secured with a lock through the at least one center rifle plate pin aperture.

17. The firearm rack assembly of claim 16 wherein the plurality of pistol plates include protuberances enabling an interlocking assembly with the pistol base.

* * * * *